United States Patent
Steudler, Jr.

[11] Patent Number: 5,230,302
[45] Date of Patent: Jul. 27, 1993

[54] WATERING SYSTEM FOR POULTRY, SMALL ANIMALS AND THE LIKE

[75] Inventor: Frederick W. Steudler, Jr., New Providence, Pa.

[73] Assignee: Val Products, Inc., Bird-in-Hand, Pa.

[21] Appl. No.: 893,148

[22] Filed: Jun. 3, 1992

Related U.S. Application Data

[63] Continuation of Ser. No. 599,208, Oct. 17, 1990, Pat. No. 5,136,982.

[51] Int. Cl.$^5$ .................................... A01K 7/00
[52] U.S. Cl. .............................. 119/72; 248/54; 119/72.5
[58] Field of Search .............. 119/72, 72.5, 75; 248/58, 56, 62, 63, 74.2, 74.3, 74.4

[56] References Cited

U.S. PATENT DOCUMENTS

| | | | |
|---|---|---|---|
| 3,253,084 | 5/1966 | Taylor | 248/74.2 X |
| 3,330,517 | 7/1967 | Zimmerman | 248/62 |
| 4,119,285 | 10/1978 | Bisping et al. | 248/74.2 X |
| 4,516,533 | 5/1985 | Mallinson | 119/72 |
| 4,566,660 | 1/1986 | Anscher et al. | 248/74.2 |
| 4,852,522 | 8/1989 | Uri | 119/72 |
| 5,097,798 | 3/1992 | Littile | 119/72 |

Primary Examiner—Gene Mancene
Assistant Examiner—Thomas Price
Attorney, Agent, or Firm—Diller, Ramik & Wight

[57] ABSTRACT

A watering system for poultry, small animals or the like including a plurality of elongated stabilizing anti-roosting members in longitudinal alignment with each other and interconnected by slidable connectors, a plurality of interconnected watering pipes below the stabilizing members, clips for connecting the stabilizing members to the watering pipe and a suspension system for suspending the overall watering system relative to a supporting surface. The clip for connecting the stabilizing members to each other in generally of an inverted V-shape configuration and the clip for securing the watering pipes to the stabilizing members is of a generally C-shaped configuration.

13 Claims, 3 Drawing Sheets

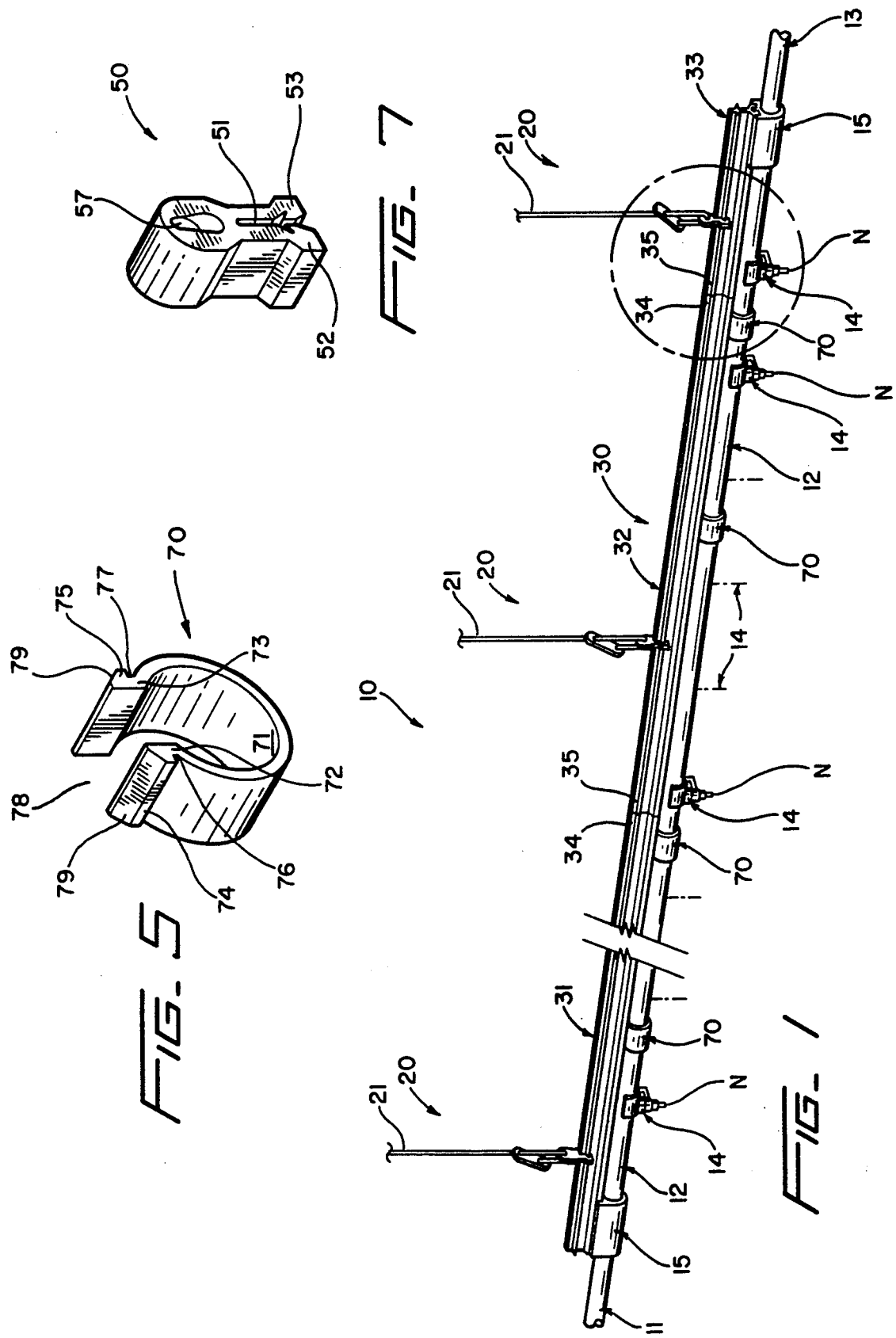

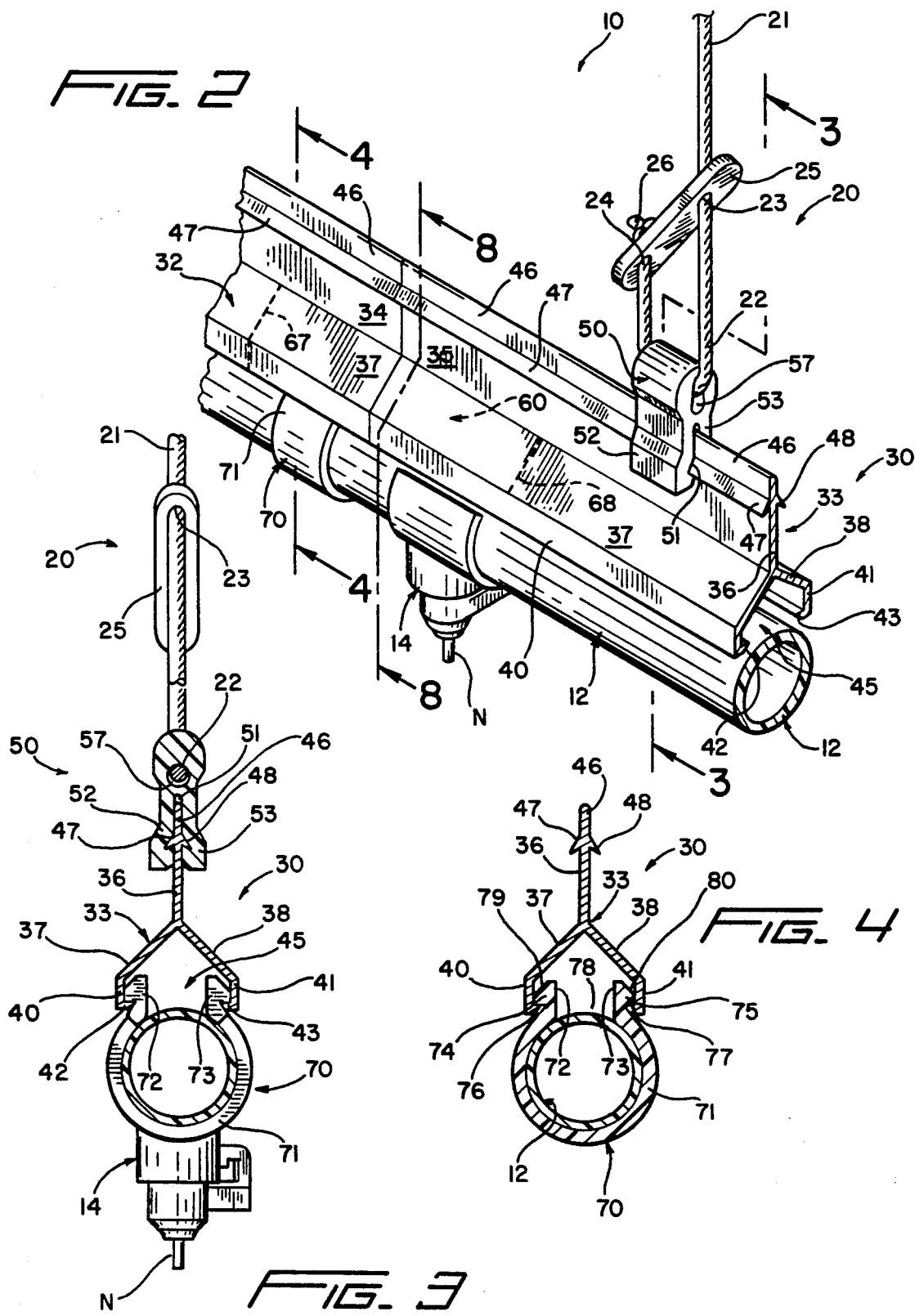

WATERING SYSTEM FOR POULTRY, SMALL ANIMALS AND THE LIKE

This application is a continuation of application Ser. No. 07/599,208 filed Oct. 17, 1990 now U.S. Pat. No. 5,136,982.

BACKGROUND OF THE INVENTION

The invention relates to a floor watering system for poultry, small animals and the like which includes a plurality of suspension clips carrying a plurality of elongated stabilizing members which can also perform an anti-roosting function. The stabilizing members are in alignment with each other and are united to each other by a slidable connector. Each stabilizing member has a pair of angularly configured legs which define a female coupler into which is received the legs of a male coupler. A plurality of the male couplers fasten watering pipes below and in generally parallel relationship to the stabilizing members. The watering pipes are in turn connected to each other and carry a plurality of drinkers. This floor watering system can be rapidly adjusted in height to quickly reposition the watering pipes and the associated drinkers as the animal/poultry grow. Typical of such a height-adjustable watering system is the system disclosed in U.S. Pat. No. 4,669,422 granted on Jun. 2, 1987 in the name of Frederick W. Steudler, Jr.

In the latter-mentioned patent the watering pipes are connected to each other by suitable couplings, as are the watering pipes of the present invention, and the couplings are preferably those disclosed in U.S. Pat. No. 4,543,912 granted on Oct. 1, 1985 to Frederick W. Steudler, Jr.

The height adjustment of the patented watering system is achieved by a plurality of flexible suspension cords, cables, etc. with a loop portion associated with each suspension clip which can rapidly cant between locked and unlocked positions. Thus, once the watering system has been installed, it can be readily elevated or lowered as conditions dictate.

SUMMARY OF THE INVENTION

The novelty and unobviousness of the present invention over that just described includes the specific construction of the suspension clips, the stabilizing/antiroosting members, slidable connectors for connecting the stabilizing/anti-roosting members to each other and snap or clip connectors for connecting the watering pipes to the anti-roosting/ stabilizing members.

Instead of a separate anti-roosting member and a separate stabilizing member, as disclosed in U.S. Pat. No. 4,543,912, the present invention provides an extruded aluminum stabilizing member which also functions as an anti-roosting member. The stabilizing member is of a generally inverted Y-shaped configuration with its upper leg being formed in a pair of oppositely directed tongues which engage with opposing complementary grooves in associated suspension clips forming a part of the overall suspension system. An upper edge of the upper leg is relatively narrow and thereby effectively performs the anti-roosting function since it is extremely difficult for poultry or small animals to place there feet thereupon and maintain balance.

The lower legs of the stabilizing member define a female coupler therebetween into which is inserted a pair of legs of a generally C-shaped clip. A plurality of such C-shaped clips surround the watering pipe and are snap-secured into the female coupler to thereby quickly and effectively effect coupling (and uncoupling) between the watering pipe and the stabilizing member.

Since such watering systems are quite long, individual watering pipes are connected to each other by conventional couplings, as described earlier herein, but individual stabilizing members must be connected to each other in end-to-end relationship. This is achieved through the use of a generally inverted V-shaped clip which is in sliding relationship between the angularly configured legs of the inverted Y-shaped stabilizing members. In this fashion the stabilizing members can be rapidly connected and disconnected relative to each other.

With the above and other objects in view that will hereinafter appear, the nature of the invention will be more clearly understood by reference to the following detailed description, the appended claims and the several views illustrated in the accompanying drawings.

BRIEF DESCRIPTION OF THE DRAWINGS

FIG. 1 is a perspective view of a novel poultry/small animal watering system of this invention, and illustrates a plurality of adjustable suspension cables connected to a plurality of suspension clips or brackets connected to stabilizing/anti-roosting members which are in turn connected to watering pipes carrying drinking nipples.

FIG. 2 is an enlarged fragmentary perspective view of the encircled portion of FIG. 1, and more clearly illustrates details of the components of the watering system and the cross-sectional configuration of the stabilizing/anti-roosting members.

FIG. 3 is an enlarged cross-sectional view taken generally along line 3—3 of FIG. 2, and illustrates a snap-connection between legs of a generally C-shaped watering pipe supporting clip and angularly configured legs of the stabilizing/anti-roosting member.

FIG. 4 is a cross-sectional view taken generally along line 4—4 of FIG. 2, and illustrates the specific cross-sectional configuration of the C-shaped clip and the stabilizing/anti-roosting member.

FIG. 5, which appears on the sheet of drawings containing FIG. 1, is a perspective view of the C-shaped clip of FIGS. 3 and 4, and illustrates the specific configuration thereof.

FIG. 7, which appears on the sheet of drawings containing FIGS. 1 and 5, is a perspective view of one of the suspension clips of the suspension system, and illustrates specific details thereof.

FIG. 6, is a cross-sectional view taken generally along line 8—8 of FIG. 2, and illustrates a generally inverted V-shaped connector slidably received between the angularly configured legs of the adjacent stabilizing-/anti-roosting members for maintaining the same in generally longitudinally aligned interconnected relationship.

DESCRIPTION OF THE PREFERRED EMBODIMENTS

Figure 8:
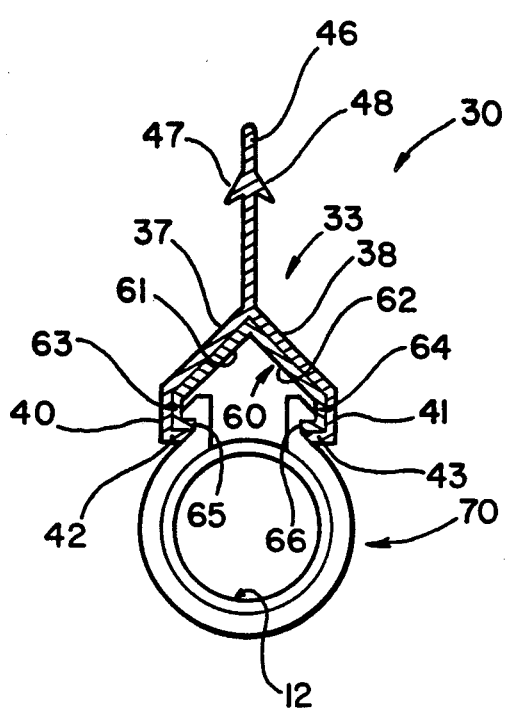
FIG. 8, which appears on the sheet of drawings containing
Figure 6:
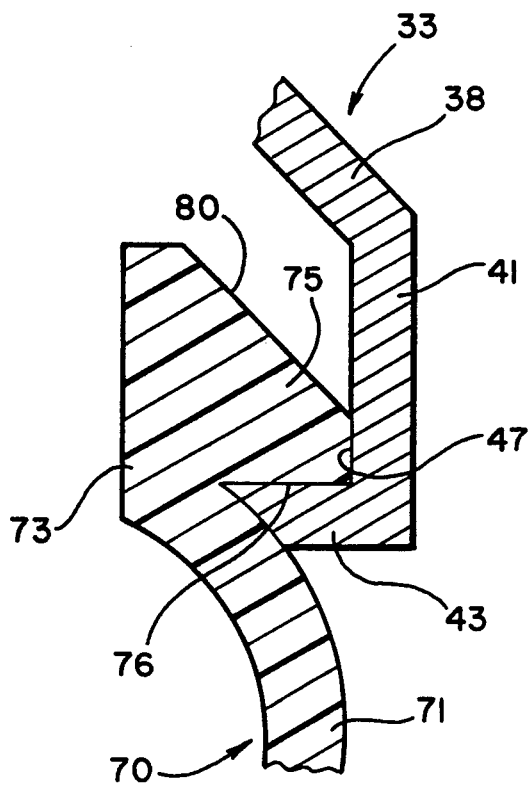
FIG. 6 is a highly enlarged fragmentary cross-sectional view of the encircled portion of the stabilizer/anti-roosting member and C-shaped clip of FIG. 4, and illustrates details of opposing tongues and grooves thereof.

A novel poultry, small animal or the like floor watering system constructed in accordance with this invention is fully illustrated in FIGS. 1 and 2 of the drawings and is generally designated by the reference numeral 10.

The watering system 10 includes a conventional water filter assembly (not shown) which receives water through a pipe (not shown) through an appropriate inlet valve (also not shown), all of which is conventional and is disclosed in U.S. Pat. No. 4,669,422. An appropriate valve (not shown). is provided at the outlet end of the water filter assembly and the same directs water to a conventional water meter (not shown). The outlet from the water meter is connected by a flexible pipe (not shown) to a water regulator (not shown) which controls the exiting water pressure to a water standpipe (not shown) which is part of a T-coupling which is in turn connected to one of a plurality of watering pipes 11, 12 and 13 (FIG. 1), each carrying a plurality of conventional drinkers 14. The watering pipes 11, 12 and 13 are connected to each other by tubular couplings 15. Details of the drinkers 14 are fully disclosed in U.S. Pat. No. 4,669,422 and details of the couplings 15 are disclosed in U.S. Pat. No. 4,543,921, and the specifics of these details are herein incorporated by reference. Essentially, water flowing through the pipes 11, 12 and 13 will exit any one of the drinkers 14 when a nipple N thereof is actuated by poultry, small animals or the like to unseat a valve (not shown).

The watering system 10 also includes a suspension system 20 and a stabilizing/anti-roosting system 30.

The suspension system 20 includes a plurality of cables or cords 21 each having a loop or loop portion 22 threaded through openings or slots 23, 24 of a clamping element 25. An end of each cord 21 is knotted at 26 and each loop portion 22 passes through a bore or hole 57 of a suspension clip or connector 50 which is connected to the stabilizing/anti-roosting system 30 in a manner to be described more specifically hereinafter. When each of the clamping elements 25 is canted, as shown in FIGS. 1 and 2, the portion (unnumbered) of the clip 50 adjacent the opening 23 "bites" into the cable 21 to prevent slippage and thereby maintains a predetermined adjusted length of the cable 21 and, thus, a predetermined distance of the watering pipes 11 through 13 above a supporting surface upon which the poultry walk, such as the floor of a poultry house. Further details of the suspension system 20 are disclosed in U.S. Pat. No. 4,669,422, and such details are incorporated hereat by reference.

The stabilizing/anti-roosting system 30 is formed of a plurality of extruded aluminum stabilizing/anti-roosting members 31, 32, 33, each having axially opposite ends or end portions 34, 35. The ends 34, 35 of the members 31, 32 are in generally adjacent relationship, as are the ends 34, 35 of the members 32, 33, as is best illustrated in FIG. 2. The adjacent ends 34, 35 of the illustrated members 31 through 33, and all other such members are interconnected to each other in generally longitudinal alignment by slidable connecting means 60 (FIGS. 8 and 9) which will be described more fully hereinafter.

Since each of the suspension/anti-roosting members 31 through 33 is identical, the following description of the member 33 will suffice for a complete understanding of the present invention. The stabilizing/anti-roosting member 33 (FIGS. 2-4 and 6) is of a generally inverted Y-shaped configuration defined by a vertical upstanding leg 36 which merges with a pair of downwardly diverging angularly configured legs 37, 38 which in turn have generally parallel side wall portions 40, 41 and opposing inwardly directed terminal ends or tongues 42, 43, respectively. The legs 37, 38 including the respective portions 40, 42 and 41, 43 thereof define a downwardly opening female coupling means generally designated by the reference numeral 45 which functions in association with a plurality of generally C-shaped watering pipe supporting clips 70 (FIGS. 3 through 5) in a manner which will be described more fully hereinafter for securing the watering pipes 11 through 13 to the stabilizing members 31 through 33.

An upper terminal end portion 46 of the leg 36 is relatively narrow and immediately therebelow and to each side are tongues 47, 48 of a generally triangular cross-sectional configuration.

The upper terminal end portion 46 and the tongues 47, 48 are snap-secured in a mirror image slot 51 (FIGS. 3 and 7) of an associated one of the suspension clips 50 defined by a pair of resilient legs 52, 53. As the upper terminal end portion 46 and the tongues 47, 48 are forced upwardly into the slot 51, the legs 52, 53 initially spread apart but rebound under the inherent resiliency of the material (polymeric/copolymeric plastic) of the suspension clip 50 to snap-secure and grip each suspension/anti-roosting member 31 through 33 in the manner clearly apparent from FIGS. 2 and 3 of drawings.

Figure 9:
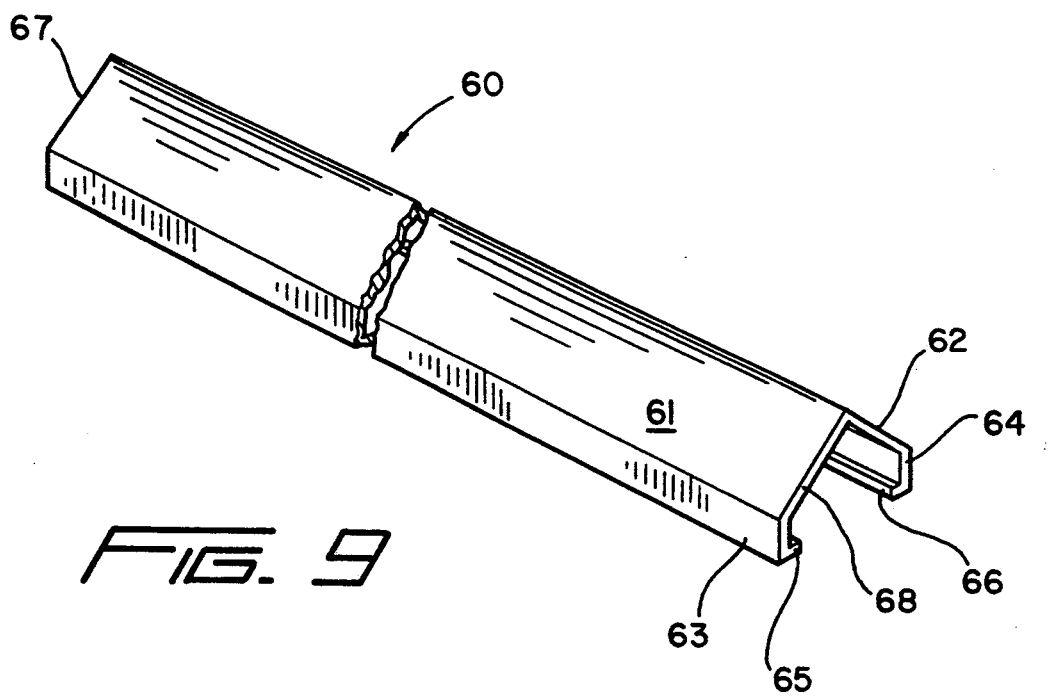
FIG. 9 is a fragmentary perspective view of the inverted generally V-shaped connector or clip of FIG. 8, and illustrates details thereof.

Reference is made to FIGS. 8 and 9 of the drawings which illustrate the slidable connecting means 60 associated with each of the end portions 34, 35 of the adjacent stabilizing members 31 through 33. Each slidable connecting means or member 60 is of a generally inverted V-shaped configuration, and is defined by downwardly diverging legs 61, 62 merging with generally parallel side wall portions 63, 64 which in turn terminate in opposing terminal end portions or flanges 65, 66, respectively. Each connecting means or clip has opposite longitudinal terminal edges 67, 68. The exterior configuration and size of each slidable connecting means or clip 60 corresponds to the internal configuration and size of the legs 37, 38 and the associated portions 40 through 43 of each of the stabilizing members 31 through 33. Accordingly, each slidable connecting clip or connector 60 is slid partially into one end portion 34 and partially into the adjacent end portion 35 of the adjacent stabilizing members 31 through 33, as is best illustrated in FIG. 8 and in broken lines in FIG. 2. As is best illustrated in FIG. 2, the clip 60 is, therefore, housed approximately half of its longitudinal length in each of the end portions 34, 35 of the adjacent members 32, 33 thereby rigidly interconnecting the members 32, 33 and maintaining the same in rigid sliding interconnected aligned relationship. This relationship is maintained over the entire length of the stabilizing/anti-roosting system 30 by similar clips 60 being so slidably connected between all adjacent end portions 34, 35 of all of the members 31 through 33 and others of the system 30 which are not illustrated. In this fashion a relatively rigid stabilizing anti-roosting system 30 can be suspended in lengths of 100–200 feet in an associated poultry house in a rigid manner thereby assuring the absence of bending or bowing in the various watering pipes 11 through 13 (and others not illustrated) which in turn assures that all of the water drinkers are located approximately the same distance from the underlying supporting surface (not shown). Obviously, the latter is important since chicks hatched on the same day grow at approximately the same rate and the rigidity of the stabilizing system 30 assures the location of the nipples N at the most efficient level for drinking purposes which, of course, would not occur if the overall stabilization system and the associated watering pipes were bowed or bent. Obviously, the same rigidity which prevents bowing of the pipes 11 through 13 prevents leakage at the couplings 15 which could occur under excessive bowing/deflection of the stabilizing system 30 and/or the pipes 11 through 13. Obviously, another advantage of the slidable connecting clips/means 60 is the fact that a slidable connection is achieved in the absence of any separate connectors, such as bolts or nuts. One need but longitudinally slidably connect each connecting clip 60 and the associated end portions 34, 35 of the various stabilizing members 31 through 33 to achieve a rigid system with fixed connection thereof being readily achieved by only a longitudinal sliding motion. It should also be noted that due to the relatively angular cross-section configuration of the legs 61, 62 and the wall portions 63, 65 and 64, 66 thereof which complements that of the legs 36, 37 and the respected portions 40, 42 and 41, 43 thereof, torsional flexure or twisting is virtually precluded, again rendering the overall stabilizing system 30 extremely rigid.

The watering pipes 11 through 13 are connected to the stabilizing/anti-roosting members 31 through 33 by the C-shaped clips 70 heretofore noted which are best illustrated in FIGS. 3 through 6 of the drawings to which specific reference is now made.

Each C-shaped clip 70 includes a generally cylindrical body portion 71 terminating in generally parallel legs 72, 73, each having a tongue 74, 75, respectively, which in turn defines a respective groove 76, 77. The tongues 74, 75 project in opposite directions and the grooves 76, 77 open in opposite directions. Each C-shaped clip 70 is constructed from relatively resilient synthetic polymeric/copolymeric plastic material, and because of this a gap or slot 78 between the legs 72, 73 can be increased from that illustrated in the drawings. Therefore, each C-shaped clip 70 can be slipped upon an associated watering pipe 11 through 13 through the slot 78 by temporarily deflecting the legs 72, 73 away from each other, but once the watering pipes 11 through 13 enter the cylindrical body portion 71, the inherent resilience of the plastic material of the clip 70 returns the legs 72, 73 toward their generally parallel relationship.

It is also to be noted that the legs 72, 73 have respective angularly related cam surfaces 79, 80, respectively. Once several of the C-shaped clips have been secured to any one of the watering pipes 11 through 13, the legs 72, 73, which collectively define male coupling means, are moved toward and progressively into the female coupling means 45 (FIG. 2) of the associated stabilizing members 31 through 33. During this insertion, the cam surfaces 79, 80 slide along the respective tongues or projections 42, 43, as is most readily apparent from FIG. 4, during which time the legs 72, 73 are deflected toward each other until the tongues 74, 75 of the legs 72, 73 pass the tongues 42, 43. Once the latter occurs, the natural resilience of the plastic material causes the legs 72, 73 to rebound away from each other whereupon the respective tongues 74, 75 engage in respective grooves 46, 47 of the female coupling means 45. The groove 46 is defined between the wall portions 40, 42, whereas the groove 47 is defined between the wall portions 41, 43, the latter being fully illustrated in FIG. 6 of the drawing. In this fashion, each C-shaped clips 70 can readily and easily be utilized to snap-secure the various watering pipes 11 through 13 to the associated stabilizing anti-roosting members 31 through 33. Obviously, the legs 72, 73 can be squeezed together to disassemble the same from the stabilizing members 31 through 33 or alternately longitudinal sliding between the C-shaped clip 70 and the stabilizing members 31 through 33 will permit ease of disassembly thereof.

From the foregoing, it is readily apparent that any desired number of the stabilizing members 31 through 33 can be slidably connected by the slidable connecting means 60 to form an extraordinarily long and rigid stabilizing/anti-roosting system 30 of any desired length while suspended therefrom can be a like extraordinarily long length of watering pipes 11, 12, 13, etc. simply by utilizing an appropriate number of the C-shaped clips 70. Furthermore, due to the specific construction of the slidable connecting means 60 and the C-shaped clips 70 heretofore described, the entire stabilizing system 30 can be rapidly assembled and disassembled relative to the watering pipes 11 through 13 and the associated couplings 15 in the absence of separate fasteners, such as screws, nuts, and/or bolts or the like. Thus, the entire watering system 10 can be efficiently assembled and disassembled which, obviously, reduces overhead and increases profit while doing so in a straight-forward and simple fashion.

Although a preferred embodiment of the invention has been specifically illustrated and described herein, it is to be understood that minor variations may be made in the apparatus without departing from the spirit and scope of the invention, as defined the appended claims.

I claim:

1. A water system for poultry, small animals or the like comprising a pair of elongated stabilizing members in generally end-to-end alignment with each other, a water pipe below and generally parallel to said stabilizing members, means for connecting said watering pipe to at least one of said stabilizing members, means for securing said stabilizing members to a suspension system, means slidably connecting together adjacent end portions of said stabilizing members, and said slidable connecting means being in internal telescopic relationship to said stabilizing members.

2. The watering system as defined in claim 1 wherein said stabilizing members each include a pair of angularly configured legs which open in a generally downward direction.

3. The water system as defined in claim 2 wherein said stabilizing members pair of legs terminate in inwardly directed opposing terminal ends, and said water pipe connecting means includes a clip having a central portion embracing said water pipe and oppositely outwardly opening grooves each receiving one of said terminal ends.

4. The watering system as defined in claim 1 wherein said stabilizing members each include a pair of angularly configured legs which open in a generally downward direction, and said slidable connecting means is of a configuration generally corresponding to the configuration of said pair of legs.

5. The watering system as defined in claim 1 wherein said stabilizing members are each an extruded member.

6. The watering system as defined in claim 4 wherein said slidable connecting means includes a pair of legs configured in correspondence to said stabilizing member legs.

7. The watering system as defined in claim 6 wherein said water pipe connecting means is a clip defined by a central portion embracing said water pipe and a pair of legs connected to said slidable connecting means pair of legs.

8. The watering system as defined in claim 6 wherein said water pipe connecting means is a clip defined by a central portion embracing said water pipe and a pair of legs connected to said stabilizing members legs.

9. The watering system as defined in claim 1 wherein said water pipe connecting means is a clip defined by a central portion embracing said water pie and a pair of legs connected to one of said slidable connecting means and said stabilizing members.

10. A watering system for poultry, small animals or the like comprising first and second elongated stabilizing members disposed substantially in alignment with each other and above and substantially parallel to a watering pipe, means for delivering water from the watering pipe to poultry, small animals or the like, means for connecting together said elongated stabilizing members and said watering pipe, and means substantially entirely internally of and connecting together said adjacent end portions of said first and second end elongated stabilizing members.

11. The watering system as defined in claim 10 wherein said first and second elongated stabilizing member are each defined by a generally downwardly opening cavity.

12. The watering system as defined in claim 11 wherein said internal connecting means is housed generally in the cavity of said first and second elongated stabilizing members.

13. The watering system as defined in claim 12 wherein said elongated stabilizing members are each of an extruded construction.

* * * * *